UNITED STATES PATENT OFFICE.

ERNST B. NEWMAN, OF ST. LOUIS, MISSOURI, ASSIGNOR TO NEWMAN ERB, OF SAME PLACE.

IMPROVEMENT IN MOLDED SADDLE-TREES AND COMPOSITIONS FOR THE SAME.

Specification forming part of Letters Patent No. 113,196, dated March 28, 1871.

*To all whom it may concern:*

Be it known that I, ERNST B. NEWMAN, of St. Louis, in the county of St. Louis and State of Missouri, have invented a new and Improved Molded Saddle-Tree and Composition for the Material of the Same; and I do hereby declare the following to be a full, clear, and exact description of the same.

This invention consists in a saddle-tree, as an article of manufacture, molded from a certain plastic composition, hereinafter fully described.

The invention also consists in the said plastic composition as the material of a molded saddle-tree.

The ingredients of the said composition and the proportions thereof are as follows: sawdust, twenty pounds; alum, six pounds; soda or other suitable alkali, ten pounds; resin or pitch, twelve pounds; glue, twenty-four pounds; borax, one pound; acetate of lead, one pound; drying-oil, one pound.

The manner of making the composition is as follows: The alkaline and the resinous elements are melted and boiled together. The glue, broken into small pieces, is melted in a separate vessel, in as much water as will cover it, and the borax and acetate of lead added thereto. When the glue, acetate, and borax are dissolved together, the solution is added to the alkaline-resinous mixture and the whole thoroughly commingled over a fire. The sawdust and alum are next added, these ingredients having been previously boiled together and then perfectly dried. The drying-oil is finally poured in to complete the composition, which is then to be stirred till it assumes the consistency of clay, when it is ready to be placed in the molds, the same having been previously oiled. The compound need not be left in the mold more than an hour. After being taken out of the mold, the article should be dried for eight or ten days in the open air.

The function of the ingredient alum is to prevent the pores of the sawdust from opening while drying; of the alkali, to render the resin soluble, so that it will combine with the sawdust; of the acetate of lead, to harden the compound and prevent it from sticking; and of the borax, to render the glue more soluble and harder when dry.

What I allege in behalf of my composition is its great cheapness and wonderful durability. The molding of saddle-trees reduces their cost fully two-thirds, and they are as durable when thus made as the best of oak, hickory, or walnut, becoming, in fact, harder and more compact with age.

Having thus described my invention, what I claim as new, and desire to secure by Letters Patent, is—

1. As an article of manufacture, a molded plastic composition saddle-tree.

2. The plastic composition composed of the ingredients specified.

To the above specification of my invention I have signed my name this 21st day of December, A. D. 1870.

ERNST B. NEWMAN.

Witnesses:
 JACOB ERB,
 HENRY REDEMEIER.